Aug. 27, 1929.  T. E. HENDERSON  1,725,918
BEARING FOR PLOW WHEELS
Filed March 6, 1925
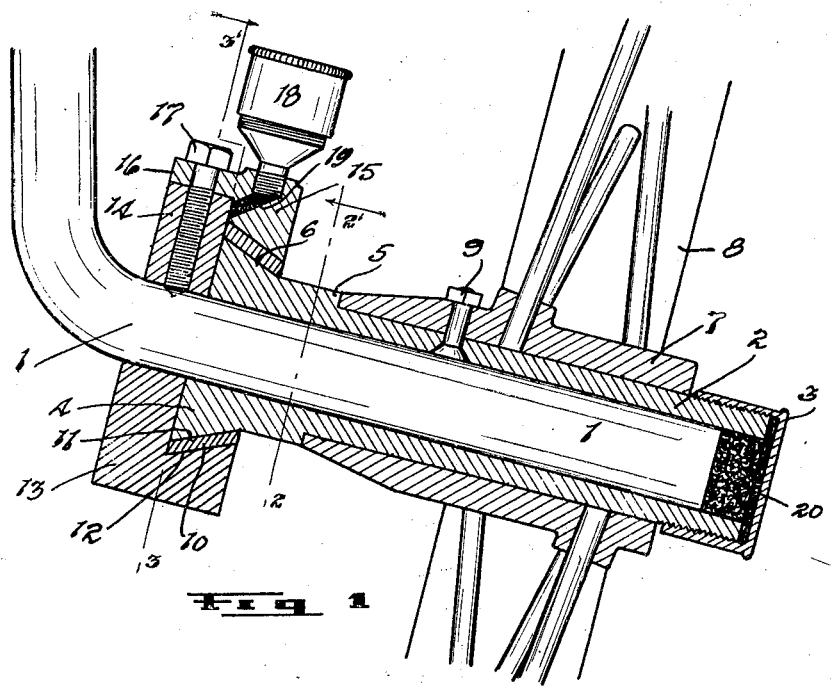
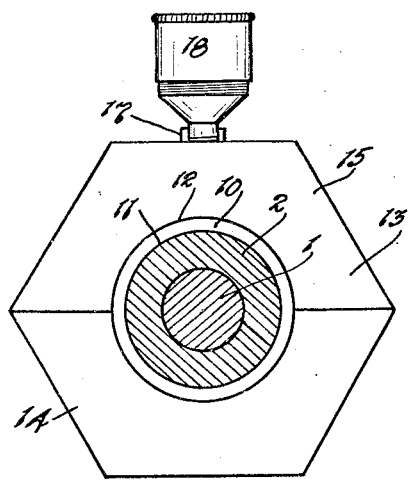
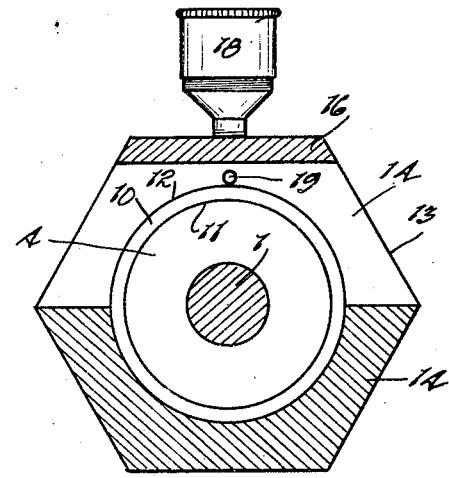
INVENTOR
T. E. Henderson
By
ATTYS Patented Aug. 27, 1929.

1,725,918

UNITED STATES PATENT OFFICE.

THOMAS EDWARD HENDERSON, OF CARIEVALE, SASKATCHEWAN, CANADA.

BEARING FOR PLOW WHEELS.

Application filed March 6, 1925. Serial No. 13,579.

The invention relates to improvements in bearings for plow wheels and particularly for the wheels of gang and sulky plows and an object of the invention is to provide a bearing which will present a considerable bearing area and which is arranged so that there is practically no possibility of the boxing pulling out of the boxing cap.

A further object of the invention is to provide a bearing embodying two bearing faces thereby distributing the thrust over two areas.

A further object is to construct the bearing so that a part thereof can be readily removed if subjected to excessive wear and without requiring the replacement of the entire boxing.

With the above more important objects in view the invention consists essentially in the arrangement and construction of parts hereinafter more particularly described, reference being had to the accompanying drawing in which:

Fig. 1 is a longitudinal vertical sectional view through the bearing and the plow wheel, the shaft being shown in side elevation.

Fig. 2 is a vertical sectional view at 2—2' Fig. 1 and looking in the direction of the applied arrow.

Fig. 3 is a vertical sectional view at 3—3' Fig. 1 and looking in the direction of the applied arrow.

In the drawing like characters of reference indicate corresponding parts in the several figures.

Gang and sulky plows, as at present made, are provided with wheels and in the plowing operation the bearings of these wheels are subject to heavy thrusts which result in the comparatively quick wearing out of the bearings. My invention relates to a bearing which can be utilized on any of the wheels and which is adapted to last a considerable time as the thrusts are distributed and a certain part of the bearing is renewable at small expense.

The axle of one of the plow wheels is indicated at 1 and on the axle I mount rotatably a sleeve or boxing 2 which has the outer end thereof fitted with a removable screw cap 3, the inner end thereof fitted with a flaring or cone shaped head 4 and the body part thereof adjoining the head provided with an enlargement or shoulder 5. The cone face of the head provides a conical bearing face 6 of considerable area at the inner end of the boxing. The hub 7 of the customary plow wheel 8 is placed on the boxing between the shoulder 5 and the cap 3 and is preferably fastened to the boxing by a bolt 9, having the head thereof countersunk in the inner side of the boxing. Accordingly when the wheel rotates the boxing rotates. On the conical head 4 I mount a conical bearing ring 10 presenting inner and outer cone faces 11 and 12, the face 11 contacting with the face 6. The ring is of the same width as the head which is free to revolve within the ring. A boxing cap 13 is mounted on the axle, the axle passing centrally therethrough and the cap comprising two mating parts 14 and 15, the part 15 being supplied with a lug 16 which overlies the part 14. A jam screw 17 passes through the lug 16 and through the part 14 and has the inner end thereof engaging the axle 1. The parts of the cap when mated together provide an internal cone shaped pocket, the wall of which provides a conical bearing face which is engaged by the bearing face 12 of the ring. An oil cup 18 is carried by the cap and feeds through a suitable duct 19 to the bearing faces of the boxing.

When the parts are to be assembled the wheel is first fastened to the boxing by the bolt 9, then the cap 13 is applied on the inner end of the boxing and then the finally assembled boxing and cap are slipped endwise onto the axle 1. Upon the screw 17 being tightened down the device is ready for use. One can place grease, indicated at 20, in the outer end of the boxing before applying the cap 3. It would be apparent that a comparatively large bearing face is given the boxing in the cap and that the wear is distributed over two faces, as the head 4 can turn in the bearing ring and the bearing ring can turn in the cap. Usually bearings of this nature are subjected to an outward thrust. The cone shape of the bearing provided is particularly effective in distributing the thrust and when necessary it is an easy matter to take up a greater part of a wear occasioned by removing the worn ring 10 and inserting a new ring. This will prolong the life of the bearing considerably and will accordingly not delay plowing operations. Usually in the present type of bearings, of which I am aware, the inner end of the boxing which is received within the cap, wears off and one has to provide an entirely new boxing when the wear becomes excessive.

What I claim as my invention is:

The combination with an axle and wheel hub, of a boxing interposed between the axle and the hub and demountably secured to the hub and rotatably mounted on the axle and having the inner end thereof terminating beyond the hub in a conical-shaped outwardly flaring head, a two piece boxing cap mounted on the axle, and provided with an interior cone-shaped pocket receiving the head, a cone-shaped bearing ring interposed between the head and the boxing cap and a jam screw fastening the two parts of the boxing cap together and securing the boxing cap to the axle.

Signed at Winnipeg this 20th day of January 1925.

THOMAS EDWARD HENDERSON.